Patented Dec. 1, 1931

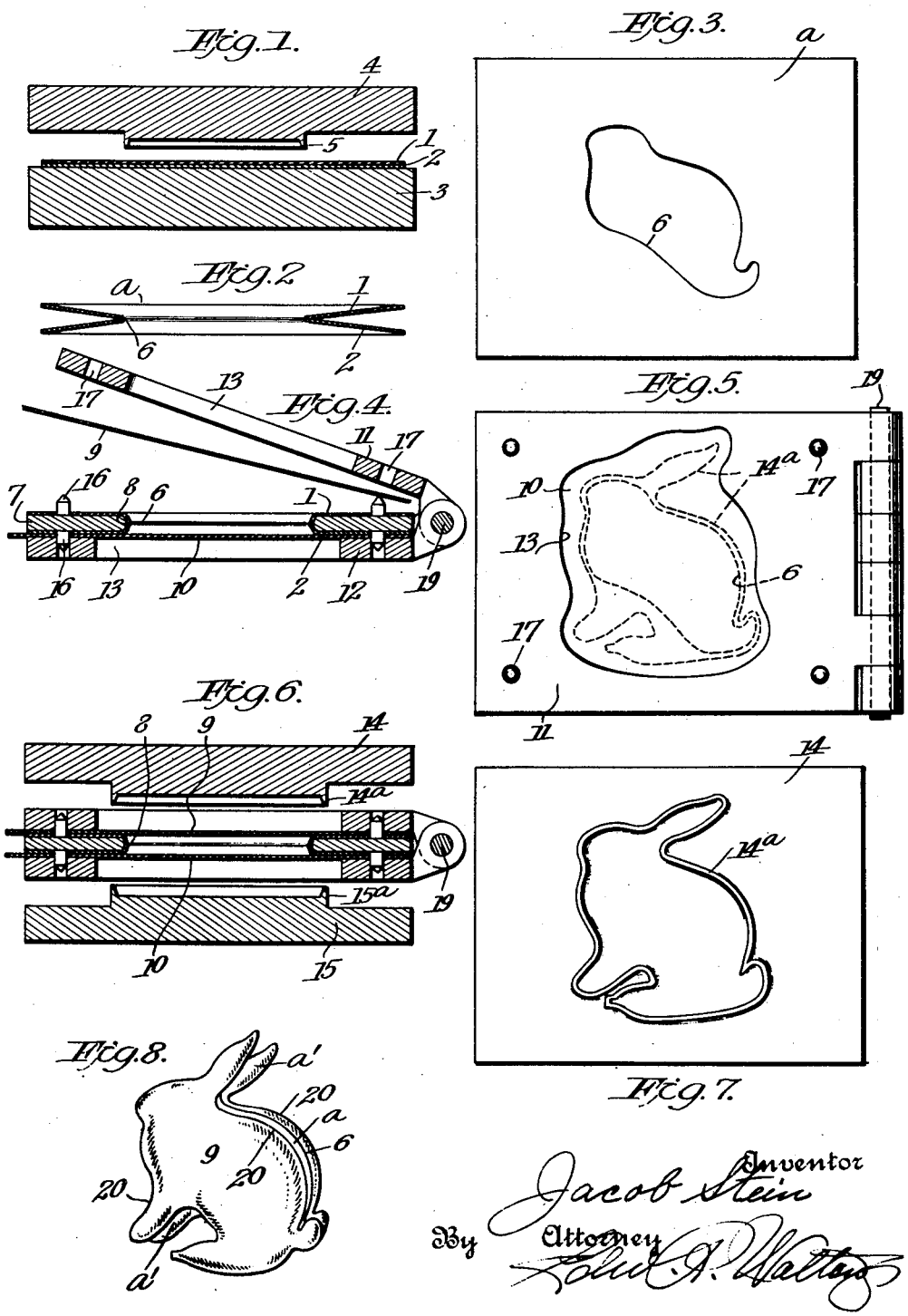

1,834,078

UNITED STATES PATENT OFFICE

JACOB STEIN, OF BROOKLYN, NEW YORK

METHOD FOR MANUFACTURING INFLATABLE ARTICLES

Application filed October 15, 1928. Serial No. 312,613.

This invention relates to a new method and apparatus for the manufacture of hollow rubber articles from superposed sheet material, wherein the parts of the sheets forming the article are joined by seams before vulcanization.

While the invention may be employed in the manufacture of various articles, the example selected for illustration is an inflatable toy; and the invention permits the manufacture of articles or toys having a multiple of lateral extensions, such as dolls of human beings or quadruped animals in true proportionation and likeness.

The invention aims to provide a process and means by which a relatively wide and thick article can be secured and, if desired, one in which the width may be increased relative to its height or length, to any desired extent and one in which also, the width at different points may be varied according to the nature of the articles, as for example, legs or arms may be made with a width materially less than the body.

The invention includes the novel method and means hereinafter described and defined by the appended claim.

In order that the invention may be better understood reference is made to the accompanying drawings, in which:—

Figure 1 showing the first operation of the method is a vertical section through a die and anvil, illustrating the same about to act upon two superposed sheet sections which provide the intermediate spacing strip between the material forming the sides of the article and which provide material for one face of double projections, such as legs, arms, and ears, etc.;

Figure 2 is an edge view of the sheet material after the operation shown in Figure 1;

Figure 3 is an enlarged plan view of Figure 2;

Figure 4 shows the material holding device comprising a platen about which the intermediate material shown in Figures 2 and 4 is placed about opposite sides of the same and sheets of material which form the size of the article applied on opposite sides of said intermediate material, and outer holding plates of the device, all of which constitute the second and third steps of the method;

Figure 5 is an enlarged plan view of the holding device with materials assembled therein, as shown in Figure 4;

Figure 6 illustrates the fourth step of the method wherein the materials assembled, as shown in Figure 4 are subjected to the cutting operation of opposing dies acting on opposite sides of the platen and through openings in said outer holding plates;

Figure 7 is an enlarged plan view illustrating the cutting edge of the die; and

Figure 8 is a perspective view of the article produced as a result of the operation shown in Figure 6, in the form of an inflatable toy rabbit.

In proceeding, according to the improved method of this invention, two sheets 1 and 2 of superposed unvulcanized rubber are placed upon an anvil or other suitable support 3, and a die 4 having combined cutting and seaming die edge 5 is brought down on the uppermost layer with sufficient force to depress this layer into contact with the lower layer and press the same against the anvil, whereby the portions of the layers lying within the edge of the die are severed and the edges lying outside of the severed portion are joined together, as at 6, this being effected by the shape of the blunt cutting die shown in the drawings, as is well understood by those skilled in the art.

The sheets 1 and 2 may be independent sheets or may be a single sheet folded upon itself and the cutting edge 5 of the die 4 is shaped to carry the body and head outline of the article to be made, but does not include the outline of parts or projections to which width is not desired or required.

The article illustrated in the drawings as being made by the invention, is an inflatable toy rabbit and Figures 2 and 3 show the result of the operation in Figure 1.

Having thus severed and removed the portion of the layers 1 and 2 lying within the die edges 5 (and which portion is discarded) and seamed together the severed edges 6 of the remaining portions of the layers 1 and 2, the latter are arranged on opposite sides of a platen 7, consisting of a flat plate having therein an opening 8 the edge of which corresponds to the contour of the cutting edge 5 of the die 4 or of the seamed edge 6 of the layers 1 and 2. This is accomplished by extending the joined layers 1 and 2 through the opening 8 and arranging the same so that the seam 6 will lie opposite and contiguous to the edge of the opening, as shown in Figure 4. These seamed layers 1 and 2 form an intermediate peripheral strip or band $a$ connecting the outer side sheet or layers 9 and 10 of the article, and provides material to form one face $a'$ of projections, such as legs, arms, etc. of objects.

This band $a$ has the medial circumferential portion thereof (which is the seam 6) having the outline of parts of the article being made (see Figures 2 and 3) and of those parts it is desired to give width to more properly simulate various forms or objects.

After placing the seamed layers 1 and 2 on the platen 7, the outer side layers 9 and 10 are applied on each side of the platen. The layers 1, 2, 9 and 10 have their surfaces dusted with talcum, sulphur, starch or other suitable material to prevent adhesion. In order that the layers 1, 2, 9 and 10 may be in smooth, flat distended position, cover or holding plates 11 and 12 are placed against the outer faces of the layers 9 and 10 and each have an opening 13 therein.

The platen 7 with its assembled layers is then placed between two opposed cutting dies 14 and 15, each having cutting and seaming ribs and edges 14ª and 15ª of the shape or design of an article or toy to be made, and which are pressed, preferably simultaneously, against opposite faces of the platen 7, by projection through the opening 13 in the plates 11 and 12, (see Figures 6 and 7). The dies 14 and 15 are brought together with sufficient force against the platen to cause the cutting and seaming ribs thereof to sever the assembled layers along the line 20, the portions of the layers 1, 2, 9 and 10 lying outside of the ribs 14ª and 15ª being removed and scrapped, and the edges of the portions lying inside said ribs being seamed together to complete the formation of the article.

The article thus made is subjected to a vulcanizing treatment, and provided with an inflating valve (not shown) by which it may be inflated after vulcanization. The article may be stamped, colored and painted in any desired manner. The width of the article, or a portion of the article, may be varied according to the distance the cutting ribs 14ª and 15ª are spaced from the edge of the opening 8 in the platen 7, thereby giving the desired contour to the article.

The platen 7 preferably has the holding plates 11 and 12 hinged thereto at one edge in order to facilitate the manipulation of the platen and the assemblage of the layers of material therebetween. Pins 16 are provided on each surface of the platen which pierce the layers 1, 2, 9 and 10 so as to hold the same in a stretched or tort condition and prevent the same from slipping. These pins 16 preferably extend through openings 17 in the holding plates, or the pins or other suitable means may be carried by the holding plates instead of by the platen.

Having thus described the invention, what is claimed is:—

A method for manufacturing inflatable toys and like objects including cutting a design from the body portion of two superposed sheets of uncured rubber and seaming the severed edges of the remaining marginal edges of said sheets, placing said remaining marginal portions of said sheets through an opening in a relatively thin flat platen so that said marginal portions will embrace said platen and lie in flat, extended position on opposite faces of said platen and with said seam of said sheets engaging the edge of said aperture, the aperture in said platen corresponding to the design cut in said sheets; then placing outer sheets of uncured rubber on each side of the platen and in superposed relation on the adjacent marginal portion, then placing on said outer sheets holding plates having apertures therein larger than the opening in said platen, then disposing said platen and assemble sheets thereon between opposing cutting dies having endless cutting and seaming ribs conforming in contour to the shape of the article desired, and causing said cutting dies to act upon the layers on each face of the platen through the openings in said holding plates and at points beyond the edge of the aperture in said platen.

In testimony whereof I have hereunto set my hand.

JACOB STEIN.